Patented Apr. 30, 1946

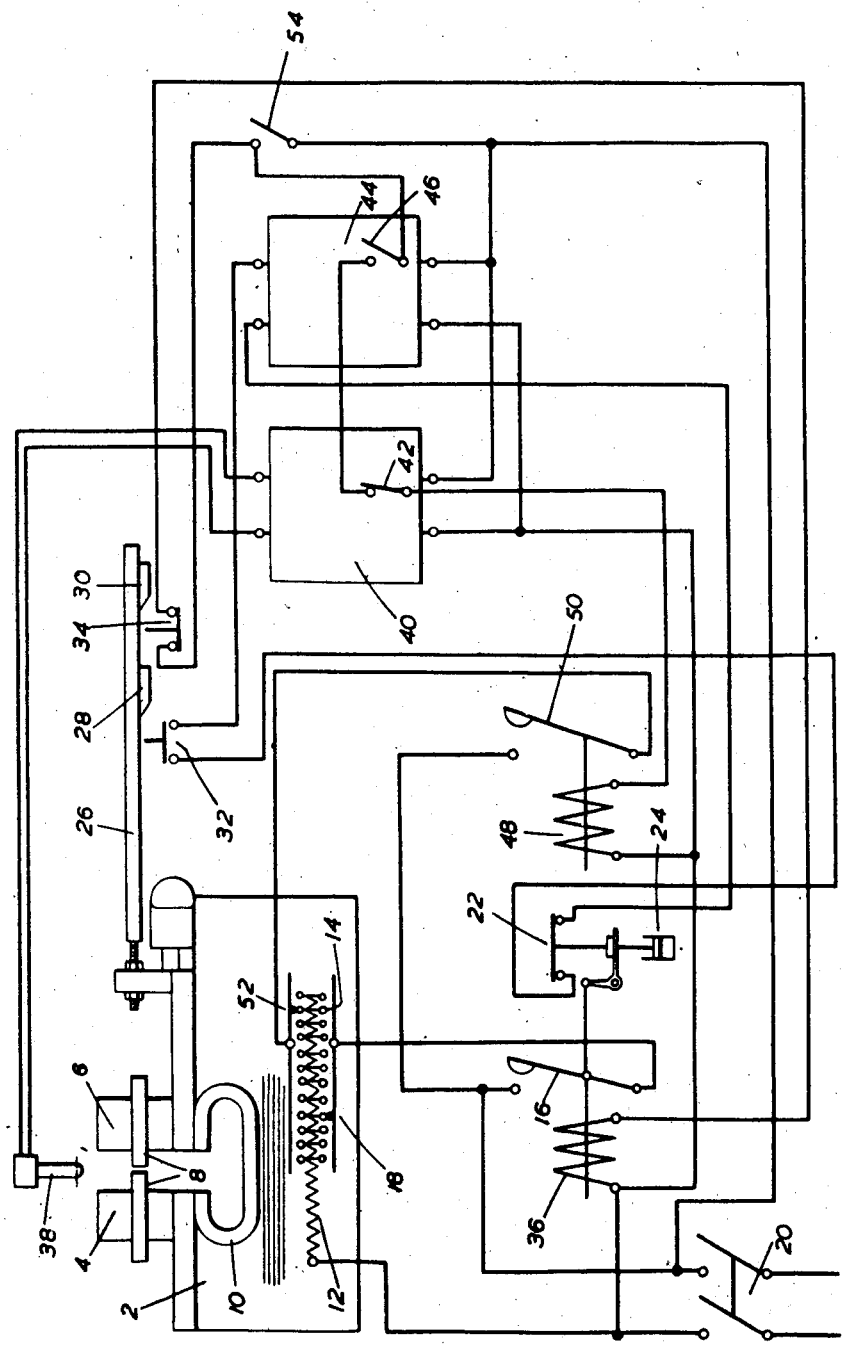

2,399,453

UNITED STATES PATENT OFFICE 2,399,453

ELECTRIC FLASH WELDING

James McGregor Sinclair, Inverness, Scotland, assignor of one-half to William Forbes Young, Inverness, Scotland Application September 27, 1943, Serial No. 503,973
In Great Britain September 21, 1942

4 Claims. (Cl. 219—4)

In the welding of certain alloy steels by electric resistance flash welding the structure of the steel is altered after the welded article has cooled and it is impossible to correct this structure by subsequent heat treatment.

It has now been found that this change in structure can be avoided by heating the steel immediately, or within a very limited period, after the completion of the weld, while the article is still clamped in the welding machine. This is effected according to the present invention by passing current through the welded article after the weld has been completed, to maintain it at a lower temperature than that which it attained during welding.

The reduction in temperature can readily be obtained by passing current through a larger part of the primary winding of the welding transformer, thus reducing the voltage of the secondary current. This winding may for example be provided with a number of tappings so that any desired number of turns can be included in the primary circuit. In a particular example, the primary winding is tapped during the welding operation at a point such that the welding current flows at a voltage of 10. After the weld is completed the primary circuit is transferred to another tapping such that current continues to flow through the welded article at 6 volts, whereby it continues to be heated by the resistance that it offers to the current. In each case the new voltage must be selected so that the temperature at which the article is held is appropriate to prevent the undesirable change of structure aforesaid, and this heat treatment is maintained for a length of time shown by experiment to be necessary.

The present invention provides means for performing these operations automatically, under the direct control of the temperature of the workpieces, either by means of a photo-sensitive device or a thermocouple or other pyrometer.

An example of the invention is illustrated diagrammatically in the accompanying drawing.

The welding machine 2 comprises, as usual, a fixed head 4 and a moving head 6 in which the workpieces 8 are clamped, a single turn secondary transformer winding 10 and a multi-turn primary winding 12. This primary winding is provided with multiple tappings 14 so that the appropriate welding current voltage can be selected beforehand, as well as the appropriate voltage for the post-heating operation.

A welding contacts 1b is maintained closed automatically during the welding operation thereby connecting a tapping 18 of the primary winding to the source of supply 20. Under these conditions the voltage in the secondary circuit 8, 10 may for example be 10 volts. In a manner to be explained the contactor 16 is automatically opened at the completion of the welding operation. This contactor is mechanically interconnected to a switch 22 so that this switch is open when the contactor 16 is closed. When the contactor 16 opens, the switch 22 tends to close but the closing is delayed by a dashpot device 24.

The moving head 6 of the welding machine has secured to it a bar 26 on which two cams 28, 30 are adjustably secured. Just before the weld is butted the cam 28 closes a switch 32 which is in series with the switch 22, the latter switch still being open. The closing of the switch 32 does not, therefore, affect the function of the mechanism. As soon as the butt takes place, however, the second cam 30 opens a switch 34 in the circuit containing the operating winding 36 of the contactor 16. The contactor 16, therefore, opens and the switch 22 closes after a time interval determined by the setting of the dashpot device 24. The opening of the contactor 16 cuts off the supply of current to the primary winding 12 through the tapping 18. In consequence the temperature of the workpieces begins to fall.

Adjacent the workpieces is a photo-sensitive unit 38 responsive to the radiation from the workpieces. This unit is connected to a control panel 40 within which is a relay 42. This apparatus is well-known, a typical example being the equipment known as the radiovisor. Associated with the control panel 40 is a timing device 44 including a normally open relay 46 which is closed by the closing of the switch 22, and is opened again after a predetermined time interval. This timing device also is a well-known piece of apparatus, an example being the Venner timer.

As the temperature of the workpieces drops, the intensity of the radiation diminishes until a point is reached when the relay 42 is closed. If at this time the time control relay 46 is also closed, a circuit is completed through the winding 48 of a contactor 50 which connects the supply 20 to the primary winding 12 through a different tapping 52 such that current flows through the welded workpieces 8 at a lower voltage than that employed during the welding. The voltage may for example be 6 volts. The workpieces will now slowly rise in temperature until the photosensitive device 38 causes the relay to open, thereby de-energising the winding 48 and causing the contactor 50 to open. The temperature of the workpieces will then drop slowly and the cycle will be repeated. By this means the workpieces will be kept within a narrow temperature range until the circuit controlled by the relays 42 and 46 is finally broken by the opening of the relay 46. After this has happened, closure of the relay 42 will be ineffective to energise the winding 48 and therefore the contactor 50 will remain open. The welded workpieces are now taken out of the welding machine. The main switch 54, which was closed to initiate the operation, is now opened manually and this causes the moving head 6 of the welding machine to return to its starting position by means which are well understood in the art. The bar 26 will, therefore, also return to its original position, the switch 32 will open and the switch 34 will close. Thus, the timing device 44 is re-set as a consequence of the opening of the switch 32 and the whole mechanism is in a condition to begin again a new cycle of operations as described.

It will be evident that the photo-sensitive device 38 could be replaced by a thermo-couple or any other kind of device directly sensitive to temperature.

What I claim is:

1. An automatic electric resistance flash welding machine including a welding transformer having a multi-tapped primary winding, a first contactor connecting the source of current supply to one tapping of the primary winding during the welding operation, a second contactor adapted to connect the source of supply to a different tapping of the primary winding, means responsive to movement of the moving head of the machine for opening said first contactor and closing said second contactor at the completion of the welding operation, and means responsive to the temperature of the welded article for actuating the second contactor during a predetermined period alternately to interrupt and re-establish the circuit through the primary winding.

2. An automatic electric resistance flash welding machine including a welding transformer having a multi-tapped primary winding, a first contactor connecting the source of current supply to one tapping of the primary winding during the welding operation, a second contactor adapted when closed to connect the source of supply to a different tapping of the primary winding, means responsive to movement of the moving head of the machine for opening said first contactor at the completion of the welding operation, delay means associated with the first contactor to cause the second contactor to close a predetermined interval after the opening of the first contactor, and time control means set in operation as a consequence of the closing of the second contactor for opening said second contactor after a further predetermined time interval.

3. An automatic electric-resistance flash welding machine including in combination a welding transformer having a multi-tapped primary winding, a first contactor connecting a source of current supply to one tapping of the primary winding during the welding operation, switch means responsive to movement of the moving head of the machine to open said first contactor upon butting of the weld, a second contactor operative to connect the source of current supply to a different tapping of the said primary winding, said second contactor being normally open, and means responsive to temperature of the workpieces for alternately closing and opening said second contactor as a consequence of cooling of the workpieces below a predetermined temperature and heating above another predetermined temperature respectively.

4. In an automatic electric resistance flash welding machine as claimed in claim 3, time control means associated with the first contactor to maintain the second contactor open for a predetermined time after opening of the first contactor, and further time control means set in operation by the closing of the second contactor for opening said second contactor independently of the temperature responsive means after a further predetermined time interval.

JAMES McGREGOR SINCLAIR.